June 26, 1923.

E. B. HINE 1,459,890

STRIP FEEDING AND PUNCHING APPARATUS

Filed May 9, 1922    3 Sheets-Sheet 1

INVENTOR
Edward B Hine
BY Chapin & Neal
ATTORNEYS

June 26, 1923.
E. B. HINE
1,459,890
STRIP FEEDING AND PUNCHING APPARATUS
Filed May 9, 1922     3 Sheets-Sheet 2
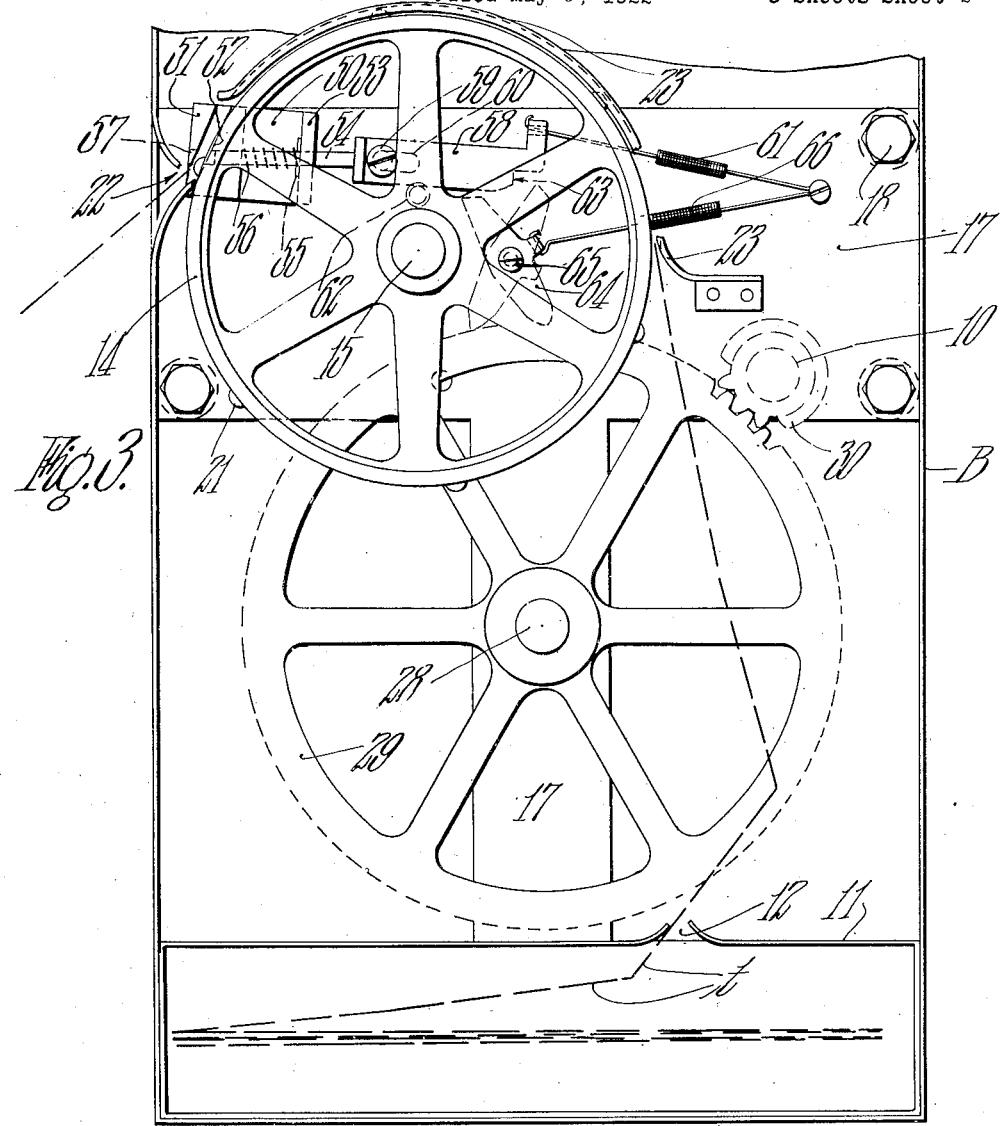
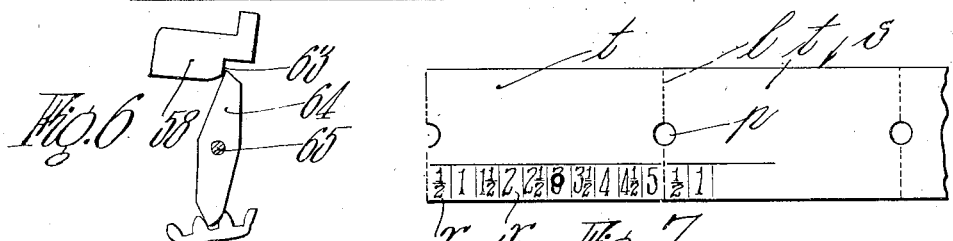
INVENTOR
Edward B. Hine
BY Chapin & Neal
ATTORNEYS June 26, 1923.
E. B. HINE
1,459,890
STRIP FEEDING AND PUNCHING APPARATUS
Filed May 9, 1922  3 Sheets-Sheet 3
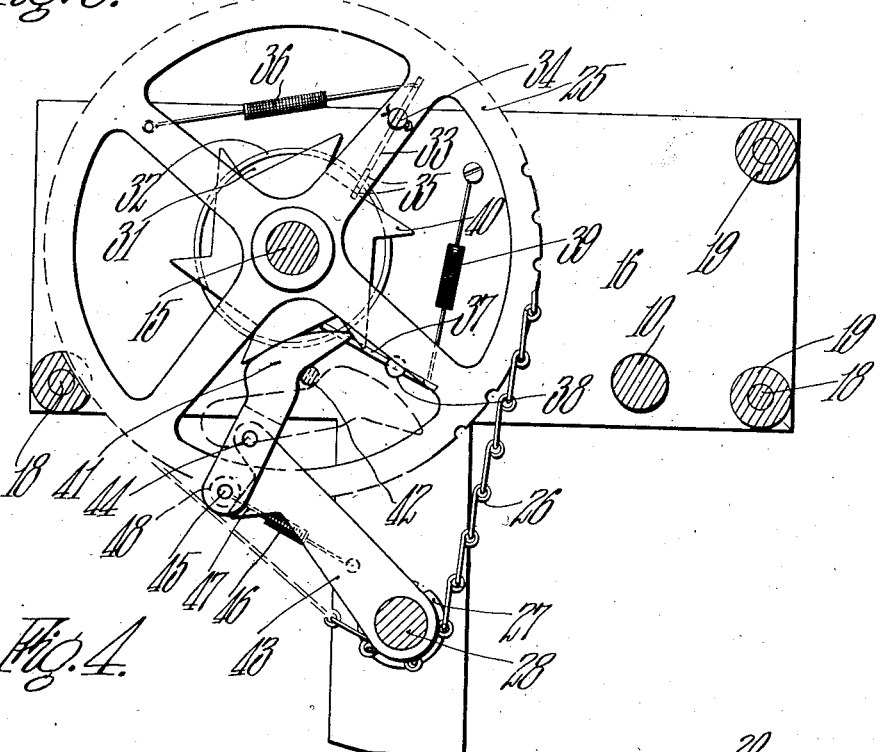
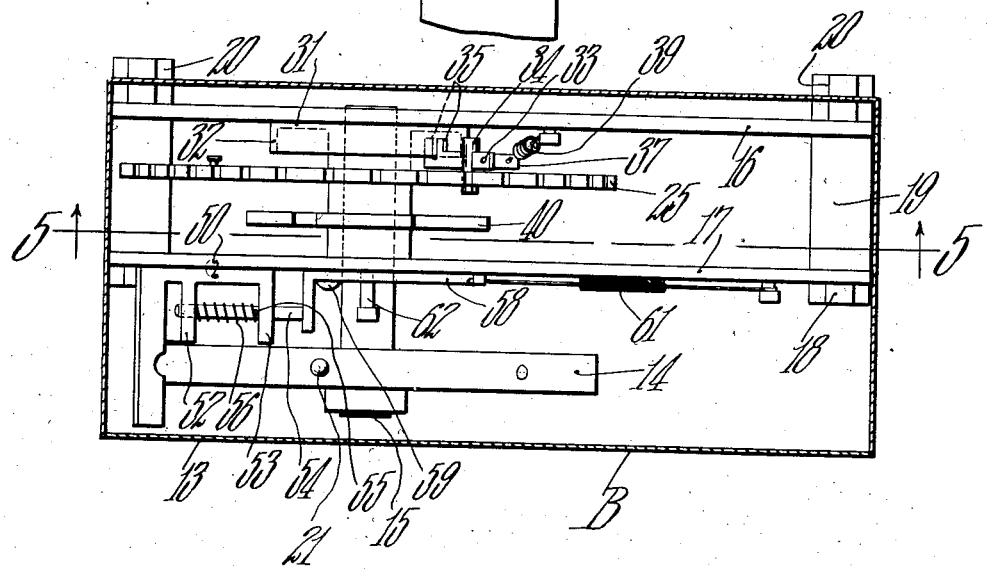
INVENTOR.
Edward B. Hine
BY Chapin & Neal
ATTORNEYS Patented June 26, 1923.

1,459,890

UNITED STATES PATENT OFFICE.

EDWARD B. HINE, OF LONGMEADOW, MASSACHUSETTS.

STRIP FEEDING AND PUNCHING APPARATUS.

Application filed May 9, 1922. Serial No. 559,679.

*To all whom it may concern:*

Be it known that I, EDWARD B. HINE, a citizen of the United States, residing at Longmeadow, in the county of Hampden and State of Massachusetts, have invented new and useful Improvements in Strip Feeding and Punching Apparatus, of which the following is a specification.

This invention relates generally to strip feeding and punching apparatus, and while the invention is capable of other uses, it is especially suitable for use in connection with liquid dispensing apparatus, such for example, as the familiar measuring pump, commonly used to dispense measured quantities of gasoline and the like. The apparatus of this invention may be applied to the pump and driven therefrom and a ticket, or the like, showing among other things the quantity of liquid dispensed, may be issued to the customer.

According to one feature of this invention, feeding mechanism for moving a record strip is provided which is adapted to be driven from any member which moves back and forth and can be used with members of this type having variable strokes. The feeding mechanism is adapted to move the strip a constant distance on each cycle of operation of said member and is characterized by two groups of mechanisms, one, the primary mechanism, functioning on one stroke only of the operating member to move the strip a distance which is proportionate to this stroke of the member and which may be variable, and the other, the secondary mechanism, functioning only on the other stroke of said member to move the strip the balance of the constant distance.

According to another feature of the invention, marking means may be employed which function at the end of the primary feeding movement to punch or otherwise mark the strip at the location to which it is moved by the primary mechanism, to indicate the extent of operation of said member characterized in that the distance between the leading end of the strip and said mark is proportionate to the stroke of the operating member.

According to this feature of the invention the record strip advantageously consists of a series of connected tickets which may be graduated longitudinally or otherwise marked to indicate fractions of the stroke of the operating member.

According to a further feature of the invention, the strip marking means is actuated from a member movable back and forth, which might be the operating member or some other member partaking of its movement, the arrangement being characterized by an effective movement of the actuating means only when said member changes in direction, as when the primary feeding mechanism ceases to function at the end of one stroke of the operating member.

Other objects and advantages will appear from the following description and the illustrative embodiment of the invention in the accompanying drawings, in which—

Fig. 3 is a large scale view of the apparatus with the cover removed to reveal the interior mechanism;

Fig. 4 is a large scale cross-sectional view taken on the line 4—4 of Fig. 2;

Fig. 5 is a fragmentary sectional elevational view taken on the line 5—5 of Fig. 4;

Fig. 6 is a fragmentary elevational view of the punch actuator; and

Fig. 7 is a plan view of a portion of the ticket strip used with the apparatus.

Figure 1:
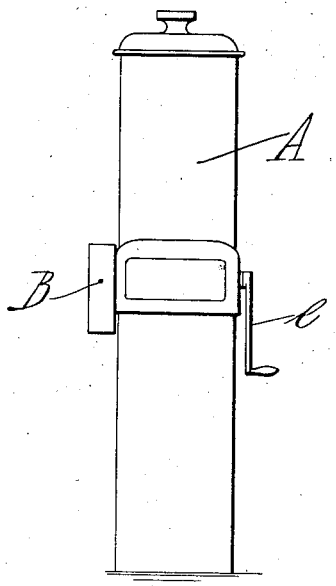
Fig. 1 is a small scale view of a familiar type of liquid measuring pump, showing the application of the invention thereto.
Figure 2:
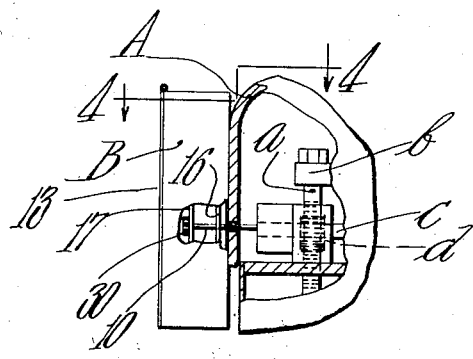
Fig. 2 is a somewhat enlarged fragmentary view, with parts in section, illustrating the manner in which the strip feeding and punching apparatus is driven therefrom.

Referring to these drawings, there is illustrated in conventional form in Figs. 1 and 2 one well known type of measuring pump, as an illustrative example serving to show the adaptation of the invention to this particular field of work. Obviously, the particular type of liquid dispensing apparatus is immaterial as the invention can be applied to any mechanism having a reciprocating or oscillating motion.

In the example shown, the dispensing apparatus is indicated at A and is substantially like that shown in U. S. Letters Patent No. 1,302,014 granted April 29, 1919, on an invention of John B. Davis. It includes a reciprocating rack $a$, connected to a cross-head $b$, by means of which the pump piston is moved, and a rotary shaft $c$, from which rack $a$ is driven by a gear $d$. The shaft $c$ is driven in any suitable manner, as by the crank handle $e$, or otherwise as desired. The amount of liquid displaced is proportional to the stroke of the pump piston, or that of rack $a$, or the extent of rotation of shaft $c$. Means, such for example, as the quantity stops shown in said patent, are employed to arrest the pump piston at various points in its stroke and enable various predetermined quantities of liquid to be delivered in a manner well known in the art. While the capacity of the pump is obviously immaterial, it will be assumed to be five gallons maximum in order better to illustrate the apparatus by the consideration of one specific example.

The apparatus of this invention is contained within a casing B which is suitably attached to the casing or frame of apparatus A in any desired location. As shown, it is located about on the level with handle $e$ which permits the apparatus to be conveniently driven from shaft $c$ and also enables the ticket issued therefrom to be reached conveniently by the purchaser. The main drive shaft of the strip feeding and punching apparatus is indicated at 10 and is directly coupled to shaft $c$ in any suitable manner.

The strip or ticket used with the apparatus may be made up in various ways as desired. As shown and as at present preferred, the strip, shown at $s$ in Fig. 7, consists of a connected series of tickets $t$ of equal length separated from each other by a transverse scored line $l$. Each ticket is divided longitudinally into a series of equal spaces $x$, suitably designated to indicate progressively the various quantities of liquid dispensed from the pump. That portion of the ticket left blank may be printed in any suitable manner, as desired, and it is not necessarily essential to designate the quantities dispensed for the cost of the quantities dispensed might equally well serve. The strip $s$ is supplied at suitable and equally spaced intervals with perforations $p$, which are conveniently, although not necessarily, located at the center of the scored lines $l$. These perforations are desired for cooperation with the feeding mechanism to admit of a positive rather than a frictional engagement therewith, but they are not otherwise essential and might be dispensed with.

A supply of the tickets in continuous strip form is provided and this supply may be received in casing B in any suitable and desired way. As shown, the supply, made up in flat compact form by folding the strip with a "fan fold" is received in a receptacle 11 located within and near the base of casing B. The receptacle has an exit opening 12 in its upper wall and its front face is open to permit tickets to be conveniently inserted in and removed from it. The open face of receptacle 11 is normally closed by a door 13 which also closes the otherwise open front face of casing B.

The tickets $t$ are moved by a feed wheel 14 which is fixed to the forwardly projecting end of a shaft 15 rotatably supported in front and rear plates 16 and 17, respectively. These plates are secured together in spaced parallel relation by bolts 18 which pass through spacer sleeves 19 and together constitute a frame on which the remaining parts of the apparatus are mounted. The bolts 18 extend through the back wall of casing B and are clamped thereto by nuts 20, thereby holding the frame in position in the casing. The feed wheel 14 is provided at suitable angularly spaced intervals with a series of projections 21 for engagement in the perforations $p$ of the strip $s$ and the latter is led upwardly from exit 12 over the upper portion of wheel 14 and thence outwardly from the casing B through an exit opening 22. Encompassing and located closely adjacent the upper portion of the periphery of wheel 14 is a curved guard member 23, (shown partially broken away in Fig. 3), which is suitably secured, as indicated, to plate 17 and which serves to prevent strip $s$ from becoming disengaged from projections 21.

The feed wheel 14 is adapted to be moved by two distinct mechanisms, termed the primary and secondary feeding mechanisms. Both mechanisms are driven from some part of the pump which moves proportionately to the piston and both move the feed wheel in the same direction. The primary feeding mechanism is, however, effective to move the feed wheel only on the delivery or up stroke of the pump piston, and the secondary feeding mechanism is effective only on the return or down stroke of the pump piston. The feed wheel thus moves intermittently but always in the same direction (counter-clockwise as viewed in Fig. 3) and the sum of the two separate increments of movement imparted by the two mechanisms is constant and sufficient to move the strip a distance equal to one ticket length, in this instance one sixth of a revolution of wheel 14. The primary feeding mechanism is adapted to move the feed wheel 14 a variable distance depending on the stroke of the pump piston and will position the ticket relatively to the punching mechanism so that the proper space $x$ is punched to indicate a quantity equal to that dispensed by the pump. The secondary feeding mechanism is adapted to move the strip a complementary distance or the difference between the length of the ticket and the distance through which it is moved by the primary feeding mechanism.

The last named mechanism, in the particular embodiment of the invention disclosed, includes a sprocket wheel 25 (Fig. 5) which is driven by a chain 26 from a sprocket 27 on a shaft 28. The latter is mounted in plates 16 and 17 and is driven by a gear 29, which in turn is driven by a pinion 30 on shaft 10. The particular train of driving connections described and the precise form of member 25 are relatively unimportant and may be varied as desired. The member 25 is freely rotatable on shaft 15 and drives the latter by means of a ratchet-like action, only during its counter-clockwise movement, this member having a reverse movement due to its connections with the pump piston. This ratchet action is obtained by means of a special clutch which functions as a ratchet wheel having an infinite number of teeth. The clutch includes a member 31 fixed on shaft 15 and having a circular flange 32 projecting outwardly toward member 25. The other member of the clutch is shown at 33 and consists of a bar slidably mounted in a stud 34 which in turn is pivotally mounted in member 25. One end of this bar has two longitudinally spaced laterally projecting fingers 35 extending one inside and one outside the flange 32 and disposed closely adjacent the latter. A spring 36 connects the opposite end of bar 33 to member 25. With this arrangement, when member 25 turns in a counter-clockwise direction, the fingers 35 grip flange 32 and cause it to turn therewith, but on a reverse movement, the fingers 35 merely slide idly over the flange. A bar 37, similar in every respect to bar 33, is similarly mounted in a stud 38 pivoted to plate 16, and cooperates with flange 32 in a similar way to hold member 31 against clockwise rotation and permit counter-clockwise rotation. A spring 39 connects the free end of bar 37 to plate 16.

The mechanism just described will move the strip $a$ on the upstroke of the pump piston and by a distance proportionate therewith, the driving connections described being such as to move the strip nearly the entire ticket length for a full stroke of the pump. The balance of the ticket movement is obtained on the return stroke of the pump by mechanism now to be described. Fixed to shaft 15 is a ratchet wheel 40 having in this instance six teeth but in any case having a number of teeth equal to the number of tickets fed by one revolution of wheel 14. For cooperation with ratchet 40, a special pawl 41 is provided which has a wedge-like end adapted to be inserted between a stop pin 42 on plate 17 and the inclined face of one of the teeth of ratchet 40, when the parts are in normal zero position, corresponding to the lowermost position of the pump piston. This arrangement prevents the wheel 14 from being moved in either direction, when in normal position, by a pull on the ticket strip or otherwise than in the intended manner. This pawl 41 is slotted to receive the free end of an arm 43 fixed on shaft 28, to which arm the pawl is pivoted at 44. Beyond the pivot 44 and extending across the slot in the pawl is a pin 45 which is connected by a spring 46 to arm 43, so as to tend to throw the ratchet engaging end of the pawl outwardly. A projection 47 on arm 43 is adapted to be engaged by a roller 48 on pin 45 to limit the outward movement of pawl 41 under the force of spring 46. On counter-clockwise movement of shaft 28, which causes the initial feeding movement of the ticket strip, the pawl 41 withdrew from its position between pin 42 and ratchet 40 and travelled idly to a position dependent upon the extent of operation of the pump, the most remote position being that shown by dotted lines in Fig. 5, wherein the pawl 41 underlies stop 42, the shaft 28 making one complete revolution on a full stroke of the pump piston. During this movement of pawl 41, the ratchet has been turned by the primary feeding mechanism throughout a part of the allotted angle of sixty degrees through which it moves on each cycle. On a clockwise rotation of shaft 28, the pawl will eventually engage a tooth of ratchet 40 and move it throughout the remainder of the angle of sixty degrees into a predetermined position, such as that illustrated in Fig. 5, wherein the pawl is arrested by pin 42 and wedges between the latter and the inclined face of one tooth of the ratchet wheel.

The punching mechanism will next be described. Referring to Figs. 3 and 4, a bracket 50 is secured to plate 17 and has two forwardly projecting, closely spaced, parallel flanges 51 and 52 between which the strip $s$ passes just before reaching the exit opening 22. The strip $s$ is wider than the face of feed wheel 14 and the flanges 51 and 52 lie closely adjacent the wheel to receive that overhanging portion of the strip carrying the designations $x$. The bracket 50 is provided with a third flange 53 which together with flange 52 slidably supports a punch 54. The latter carries a pin 55 and a spring 56, acting between flange 52 and pin 55, normally holds punch 54 in the illustrated retracted position. The punch is adapted to be projected across the space between flanges 51 and 52 and into hole 57 in the former to perforate one of the spaces $x$. The rear end of punch 54 projects beyond flange 53 into the path of a member 58 which is held to plate 17 by a screw 59 passing through a slot 60 in member 58. A spring 61 tends to hold member 58 in the illustrated retracted position, wherein screw 59 abuts the forward end of slot 60. This spring also tends to swing member 58 downwardly, with screw 59 as a pivot, and such movement is limited by the abutment of member 58 with a pin 62 projecting forwardly from plate 17. The member 58 is provided with a shoulder 63 which is adapted to be engaged by an actuator 64, whereby member 58 is moved forwardly and punch 54 projected through the ticket strip.

The actuator 64 is pivoted at 65 to plate 17 and is connected at a point intermediate its ends, by a spring 66 to plate 17, the arrangement being such that actuator 64 is normally held in the position illustrated by full lines in Fig. 3. In such position, the upper end of the actuator lies beneath member 58 and forwardly of shoulder 63 and the lower end projects into a tooth space of the described gear 29 and lies rearwardly of the line of centers of pivot 65 and shaft 28. Consequently, immediately on a counter-clockwise movement of gear 29, the lower end of actuator 64 is engaged by the gear and swung to the left, which causes the upper end of the actuator to engage the lower edge of member 58, lifting the latter against the restraining force of spring 61, and snapping into the dotted line position to the rear of shoulder 63. The spring 61 returns member 58 into the illustrated position in which the shoulder 63 is located in the path of actuator 64 when moved in a counter-clockwise direction. Thus, immediately on actuation of the pump, the actuator 64 is moved from a position, in which it is ineffective to operate the punch, into a position in which it is effective for this purpose. Continued counter-clockwise movement of gear 29 will not disturb the effectiveness of the position of actuator 64, although the latter will oscillate through a slight angle as it moves slightly in and out of the tooth spaces of gear 29 during movement of the latter. During the counter-clockwise movement of gear 29, the ticket t is fed forwardly proportionately to the stroke of the pump and comes to rest in proper position for punching and must be punched before the secondary feeding mechanism comes into play to move the ticket out of such position. This result is accomplished at the start of the return, or clockwise, movement of gear 29 for the lower end of actuator 64, will be engaged by a tooth of the gear and swung back into its original position. In such movement of the actuator, the shoulder 63 of member 58 is engaged and the latter is moved to project the punch 54. Continued clockwise movement of gear 29 cannot again cause the punch to be actuated for the actuator can only be rendered effective by a change of movement of gear 29. It should be noted, however, that should the operator change the direction before returning the pump piston to its normal or zero position, the strip s will be again fed forward proportionately to the additional quantity of fluid delivered and again punched to show the additional quantity, the uppermost positions of the pump piston on each operation being recorded on one or more tickets, which truly show the actual operation of the pump.

The operation will sufficiently appear from the foregoing description.

The invention has been disclosed herein, in an embodiment at present preferred, for illustrative purposes but the scope of the invention is defined by the appended claims rather than by the foregoing description.

What I claim is—

1. The combination with a measuring pump, of a member movable back and forth by and proportionately with the pump piston, ticket feeding means operable on movement of said member in one direction to move the ticket by distances equal to various fractions of its length depending on the stroke of the pump piston, and auxiliary feeding means subsequently operable during movement of said member in the other direction to move the ticket by complementary distances.

2. The combination with a measuring pump, of a member movable back and forth by and proportionately with the pump piston, strip feeding mechanism operable on each cycle of movement of said member to move the strip a predetermined distance and including a primary feeding means effective on movement of said member in one direction to move the strip by various distances not exceeding said predetermined distance and a secondary feeding means effective on movement of said member in the other direction to move the strip the remainder of said predetermined distance.

3. The combination with a measuring pump, of a member movable back and forth by and proportionately with the pump piston, ticket feeding means operable on movement of said member in one direction to move the ticket by distances equal to various fractions of its length depending on the stroke of the pump piston, auxiliary feeding means subsequently operable during movement of said member in the other direction to move the ticket by complementary distances, and means operable after the operation of the first named feeding means and before operation of the last named feeding means to mark the ticket to indicate the quantity of liquid dispensed from the pump.

4. The combination with a measuring pump, of a member movable back and forth by and proportionately with the pump piston, ticket feeding means operable on movement of said member in one direction to move the ticket by distances equal to various fractions of its length depending on the stroke of the pump piston, auxiliary feeding means subsequently operable during movement of said member in the other direction to move the ticket by complementary distances, and means operable as said member changes its movement from the first to the second named direction to mark the ticket to indicate the quantity of liquid dispensed from the pump.

5. In combination with a dispensing pump, ticket marking means, mechanism operable by movement of the pump piston on its delivery stroke to move the ticket relatively to said means by a distance proportionate to the distance travelled by the pump piston, said mechanism being ineffective to move the ticket on the return stroke of the piston, means operable by the change of direction of the pump piston from delivery to return stroke to mark the ticket at the location to which it is moved by said mechanism and means operable during the return stroke to move the ticket the remainder of its length.

6. In combination, ticket marking means, mechanism to move a ticket to any of various predetermined positions with relation to said means, means operable after the operation of said mechanism to actuate the first named means, and mechanism operable thereafter to move the ticket the remainder of its length.

7. In combination, an operating member movable back and forth and having a variable stroke, strip marking means, a record strip having its leading end substantially in line with said means, primary and secondary strip feeding mechanism operable alternately and together effective to move the strip a constant distance on each cycle of operation of said member, said primary mechanism effective on one stroke only of said member and moving the strip a distance proportionate to the stroke of said member, said secondary mechanism effective on the other stroke only of said member and moving the strip the balance of said constant distance, and means operable between the operations of the primary and secondary mechanisms to actuate said marking means.

8. In combination, a toothed operating member movable back and forth and capable of varying strokes, a record strip movable by said member, strip marking means, and an actuator therefor normally ineffectively positioned and having a part engaged with the teeth of said member, said actuator being movable into effective position as said member moves away from normal position and again movable into effective position as the member starts on its return movement, the actuator arranged to actuate said marking means during its movement into ineffective position.

9. In combination, a toothed operating member movable back and forth and capable of varying strokes, a record strip movable by said member, strip marking means, and an actuator therefor pivoted adjacent the toothed member and having a part adapted to enter the tooth spaces thereof, said actuator normally assuming an inclination with respect to said member and movable into normal relation and then into an opposite inclination therewith on a change in direction of said member.

10. In combination, a strip marking member, an operating device therefor mounted for reciprocable and swinging movement, yieldable means for restraining the swinging movement and retracting the device in its reciprocating movement, a toothed operating member movable back and forth adjacent said device, an actuator pivoted intermediate its ends and located between the last named member and said device, said actuator being greater in length than the normal distance between said device and operating member, yieldable means tending to hold the actuator in either of two positions of inclination with respect to the toothed member, said actuator having a part to enter the tooth spaces of the latter and being movable on each change in direction thereof from one inclined position to another and arranged to actuate said device during one shift in inclined positions and to swing said device during the other shift to permit it to pass by said device.

11. In combination, a feed wheel for moving a record strip, an operating member movable back and forth and capable of varying strokes, means effective on one stroke only of said member for driving said feed wheel in one direction, a ratchet movable with the feed wheel, and a pawl movable with said member and arranged on the other stroke of movement thereof to engage the ratchet and move the feed wheel in the same direction into a predetermined position.

12. In combination, a feed wheel for moving a record strip, an operating shaft movable back and forth through variable angles, driving connections between said shaft and wheel including means whereby the former is effective to drive the latter on movement in one direction only, a ratchet movable with the feed wheel through various distances not exceeding one tooth space which corresponds to the maximum movement of said shaft, an arm fixed to the latter, and a yieldable pawl carried by the arm and engageable with the ratchet when the shaft is moved in the other direction to move the ratchet the balance if any of said tooth space distance.

13. In combination, a feed wheel for moving a record strip, an operating shaft movable back and forth through variable angles, driving connections between said shaft and wheel including means whereby the former is effective to drive the latter on movement in one direction only, a ratchet movable with the feed wheel through various distances not exceeding one tooth space which corresponds to the maximum movement of said shaft, an arm fixed to the latter, a yieldable pawl carried by the arm and engageable with the ratchet when the shaft is moved in the other direction to move the ratchet the balance if any of said tooth space distance, and a stationary stop adjacent the periphery of the ratchet, said pawl having a wedge-shaped end adapted to be inserted between the stop and ratchet as the latter comes to rest under movement by said pawl.

In testimony whereof I have affixed my signature.

EDWARD B. HINE.